United States Patent
Nakano et al.

(10) Patent No.: US 8,336,376 B2
(45) Date of Patent: Dec. 25, 2012

(54) THERMAL FLOW METER

(75) Inventors: Hiroshi Nakano, Hitachi (JP);
Masahiro Matsumoto, Hitachi (JP);
Keiji Hanzawa, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 332 days.

(21) Appl. No.: 12/844,429

(22) Filed: Jul. 27, 2010

(65) Prior Publication Data

US 2011/0023597 A1    Feb. 3, 2011

(30) Foreign Application Priority Data

Jul. 30, 2009   (JP) ................................. 2009-177186

(51) Int. Cl.
*G01F 1/68* (2006.01)
(52) U.S. Cl. .................................. 73/204.15; 73/204.25
(58) Field of Classification Search ........................ None
See application file for complete search history.

(56) References Cited

U.S. PATENT DOCUMENTS

| | | | |
|---|---|---|---|
| 7,010,971 B2 * | 3/2006 | Matsumoto et al. | ....... 73/204.15 |
| 2005/0120789 A1 * | 6/2005 | Matsumoto et al. | ....... 73/204.15 |
| 2007/0181554 A1 | 8/2007 | Nakano et al. | |
| 2009/0007656 A1 * | 1/2009 | Ohtsuka et al. | ............ 73/204.15 |

FOREIGN PATENT DOCUMENTS

| | | |
|---|---|---|
| JP | 2000-314645 A | 11/2000 |
| JP | 2007-205986 A | 8/2007 |

* cited by examiner

*Primary Examiner* — Harshad R Patel
(74) *Attorney, Agent, or Firm* — Crowell & Moring LLP

(57) ABSTRACT

Provided is a heating temperature adjustment circuit in a thermal flow meter capable of adjusting fluctuations of a heating temperature of a heat-generating resistor due to fluctuations of resistances with high accuracy and low cost. The thermal flow meter comprises: a heat-generating resistor that generates heat when a current flows therethrough; a first temperature measuring resistor, a second resistor, a third resistor, and a fourth resistor whose resistance values vary due to temperature; and a fixed resistance having a resistance temperature coefficient lower than that of the first temperature measuring resistor, and measuring a flow rate of a fluid by controlling the heating temperature of the heat-generating resistor. The thermal flow meter includes: a first series circuit in which the fixed resistance, the first temperature measuring resistor, and the second resistor are connected to one another in series; and a second series circuit in which the third resistor and the fourth resistor are connected to each other in series, and generates a voltage to be added to the second series circuit based on voltages at both ends of the fixed resistance.

16 Claims, 10 Drawing Sheets

THERMAL FLOW METER

BACKGROUND OF THE INVENTION

1. Field of the Invention

The present invention relates to a thermal flow meter that measures a flow rate by placing a heat-generating resistor in a fluid to be measured, and more particularly relates to a thermal flow meter suitable for measuring an intake air flow rate or an exhaust gas flow rate of an internal combustion engine in an automobile.

2. Description of the Related Art

Thermal air flow meters capable of directly measuring a mass flow rate have become mainstream, as flow rate sensors that detect an intake air amount of an internal combustion engine in an automobile or the like.

In recent years, a thermal flow meter in which sensor elements are formed on a semiconductor substrate such as a silicon (Si) substrate, by using the micro machine technology. In such a semiconductor type thermal flow rate sensor, a hollow section is made by cutting out a part of the semiconductor substrate in a rectangular shape, and a heat-generating resistor is formed on an electrical insulating film having a thickness of a few micrometers that is formed in the hollow section. The heat-generating resistor has a micro size of several hundreds micrometers and is formed in a thin film shape, so that the thermal capacity thereof is low, thereby achieving fast response and low power consumption. Furthermore, a forward flow and a reverse flow can be distinguished by using a temperature difference method in which temperature sensors (temperature measuring resistors) are formed at the upstream and downstream sides of a vicinity of the heat-generating resistor, respectively, and a flow rate is detected based on a temperature difference between the temperatures at the upstream and downstream sides of the heat-generating resistor.

Consider a case where such an air flow meter is mounted to an internal combustion engine in an automobile and the like, and is used under harsh environment conditions. In such case, the air flow meter is exposed to harsh temperature conditions depending on a season, an area in which the air flow meter is used, and heat generated by an engine. Thus, a flow rate sensor should be capable of detecting a flow rate with high accuracy even under conditions where the temperature changes between −40° C. to +125° C. JP Patent Application Publication No. 2000-314645 discloses a flow rate sensor as a related art applicable to such temperature conditions.

The technology disclosed in JP Patent Application Publication No. 2000-314645 is a circuit configuration in which a heating temperature of a heat-generating resistor is determined based on a resistance value of a fixed resistance having small variations in resistance value caused by temperature. Accordingly, the resistance value of the fixed resistance does not vary with outside temperature changes, so that a temperature difference between the temperature in the heat-generating resistor and the temperature outside the heat-generating resistor can be held constant, thereby reducing variations of detection sensitivity. In addition, a resistance balance is adjusted by a variable resistance in order to deal with fluctuations of the resistance values of temperature measuring resistors or fixed resistances due to the production process.

SUMMARY OF THE INVENTION

A variable resistance for adjusting a resistance balance is generally adjusted by trimming the variable resistance mechanically using laser trimming, mechanical trimming, or the like. Such a variable resistance whose resistance value is mechanically adjusted has a higher resistance temperature coefficient than a fixed resistance, and also has a large fluctuation of the resistance temperature coefficient. Therefore, according to the related art, the balance of the resistance value can be adjusted, while the fluctuations of the resistance temperature coefficient remain unchanged. Accordingly, there is a limitation in adjustment accuracy for a heating temperature of a heat-generating resistor. Furthermore, there is a problem in that sufficient adjustment accuracy cannot be obtained when the resistance value of the variable resistance is adjusted by using mechanical trimming. In addition, there is also a cost problem in that mechanical trimming devices are required in a mass production process and trimming requires much time.

An object of the present invention is to provide a thermal flow meter capable of adjusting a heating temperature of a heat-generating resistor in such a manner as to hold a constant temperature, and of detecting a stable flow rate, even if the thermal flow meter is mounted to an internal combustion engine in an automobile or the like, and is exposed to harsh temperature changes.

In order to achieve the above object, a thermal flow meter according to the present invention includes a control circuit to control a heating temperature in a heat-generating resistor that generates heat when a current flows therethrough, and measuring a flow rate of a fluid. In the thermal flow meter, the control circuit includes: a first series circuit in which a fixed resistance, a first resistor, and a second resistor are connected to one another in series; a second series circuit in which a third resistor and a fourth resistor are connected to each other in series; and a voltage generation circuit that takes out voltages at both terminals of the fixed resistance and outputs a voltage adjusted within a range between the voltages at both terminals, a terminal at a side of the fixed resistance of the first series circuit is connected to a first reference potential, a terminal at a side of the third resistor of the second series circuit is connected to an output voltage of the voltage generation circuit, and the other terminal of the first series circuit and the other terminal of the second series circuit are connected to a second reference potential, and at least the first resistor and one among the second resistor and the third resistor are formed respectively of temperature-sensitive resistors each having a resistance temperature coefficient higher than that of the fixed resistance.

Here, it is preferable that the heat-generating resistor is provided outside the control circuit, and the resistor formed of the temperature-sensitive resistor among the second resistor and the third resistor is placed near the heat-generating resistor. Here, it is preferable that the thermal flow meter includes a planar substrate having a thin wall portion, that the heat-generating resistor and the resistor formed of the temperature-sensitive resistor among the second resistor and the third resistor are placed in the thin wall portion, and that the resistor formed of the temperature-sensitive resistor among the second resistor and the third resistor is made of the same material as that of the first resistor.

The third resistor may be formed of the heat-generating resistor.

It is preferable that all of the first resistor, the second resistor, the third resistor, and the fourth resistor are formed of temperature-sensitive resistors made of the same material.

In the above configuration, it is preferable that one of the first and second reference potentials is set to be a ground potential and the other one of the first and second reference potentials is set to be higher than the one of the first and second reference potentials.

It is preferable that the voltage generation circuit includes: a series resistance circuit including a plurality of resistances connected in parallel to both ends of the fixed resistance; a voltage selection circuit that selects a connection point between any resistances in the series resistance circuit and outputs a voltage at the connection point; and a buffer amplifier that adds the voltage selected by the voltage selection circuit to the second series circuit.

It is preferable that the voltage selection circuit is formed of a transistor switch.

It is preferable that the resistance temperature coefficient of the fixed resistance is 100 ppm/° C. or less.

It is preferable that the thermal flow meter includes: a means for controlling a current flowing through the heat-generating resistor; a means for detecting a differential voltage between a voltage in the first series circuit and a voltage in the second series circuit; and an adjustment means for selecting a voltage to be added to the second series circuit based on the differential voltage.

According to the above-mentioned features, it is possible to realize a circuit configuration equivalent to the configuration that adjusts a resistance value by using a variable resistance. In addition, the circuit configuration with high accuracy can be achieved because no variable resistance having a large fluctuation in addition to a high resistance temperature coefficient is required. In addition, the above-mentioned voltage generation circuit can arbitrarily set a terminal voltage of the second series circuit. Accordingly, advantageous effects of expanding the adjustment range and of improving the adjustment resolution are obtained.

According to the present invention, provided is a thermal flow rate sensor with high accuracy and low cost that adjusts a resistance balance with high accuracy and simplicity without using mechanical resistance trimming.

DESCRIPTION OF THE PREFERRED EMBODIMENTS

Embodiments according to the present invention will be described below.

First Embodiment

A first embodiment according to the present invention will be described below.

A drive circuit and a detection circuit in a thermal flow meter according to the embodiment will be described.

Figure 1:
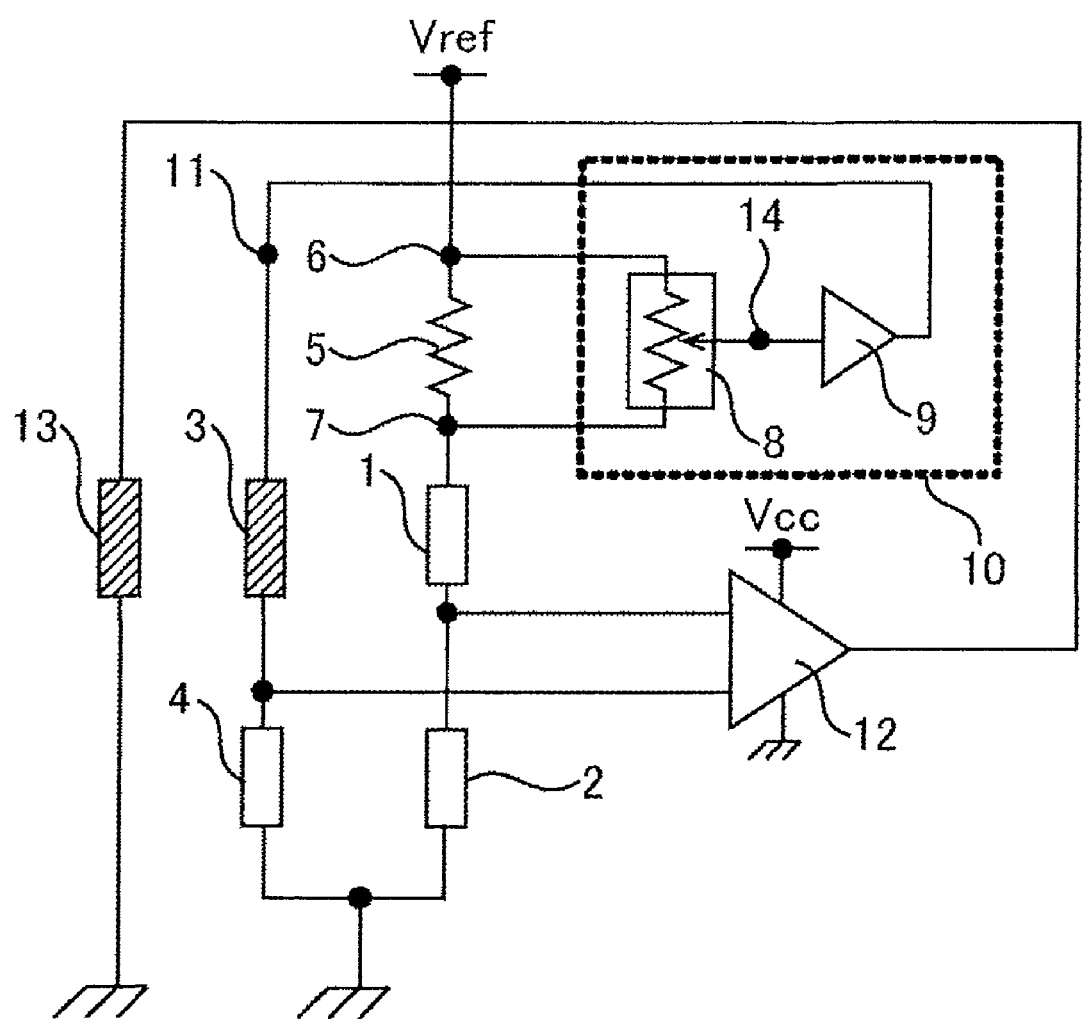
FIG. 1 shows a drive circuit in a thermal flow meter according to a first embodiment of the present invention.

FIG. 1 shows a drive circuit of a heat-generating resistor 13. The drive circuit includes a temperature measuring resistor 3 (third resistor) that is placed near the heat-generating resistor 13 and whose resistance value varies with the temperature in the heat-generating resistor 13, temperature measuring resistors 1 (first resistor), 2 (second resistor), and 4 (fourth resistor) whose resistance values vary with the temperature in a fluid to be measured, and a fixed resistance 5 whose resistance value hardly depends on the temperature. The resistance balance of these resistors controls the heating temperature in the heat-generating resistor 13. A temperature measuring resistor, which is generally called as a temperature-sensitive resistor as well, has a resistance temperature coefficient higher than that of the fixed resistance 5, and has a resistance value that highly depends on the temperature.

Figure 6:
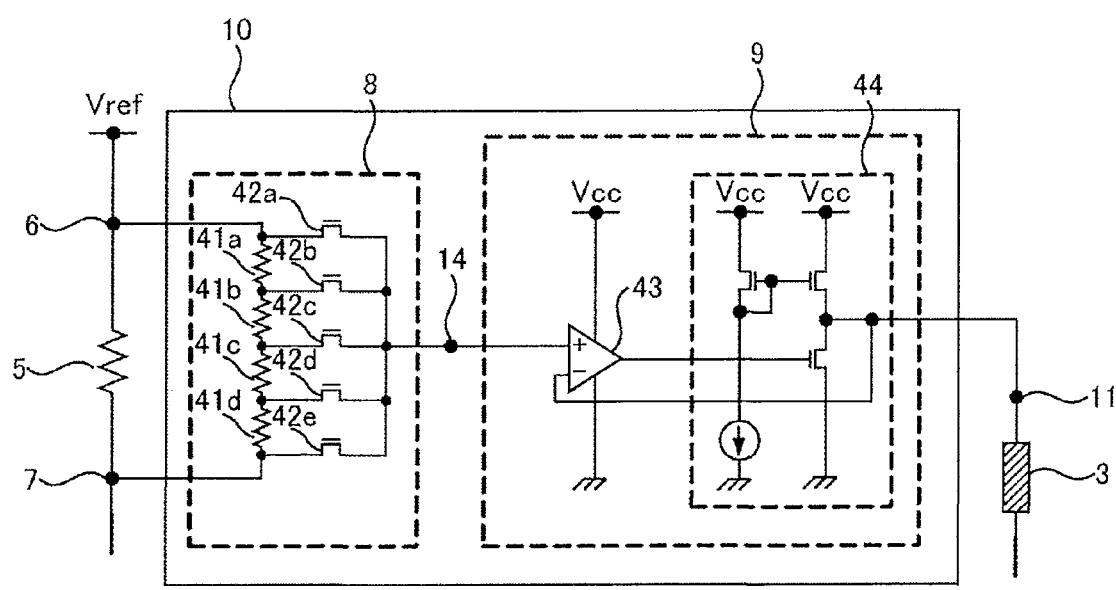
FIG. 6 is a circuit diagram showing a detailed configuration of a voltage generation circuit 10 in FIG. 1.

A reference voltage Vref that is a first reference potential is applied to a series circuit including the fixed resistance 5, the temperature measuring resistor 1, and the temperature measuring resistor 2. A terminal voltage V6 and a terminal voltage V7 at both ends 6 and 7 of the fixed resistance 5 are taken out, and are inputted to a voltage generation circuit 10. In the voltage generation circuit 10, as shown in FIG. 6, multiple resistances 41a to 41d are connected to one another in series, and a voltage selection circuit 8 that takes out a terminal voltage between arbitrary resistances selects an arbitrary voltage within the voltage range from the terminal voltage V6 to the terminal voltage V7, so that the voltage selection circuit 8 obtains a terminal voltage V14 at an output 14 thereof. A current flowing through the voltage selection circuit 8 is made to the minimum by setting a resistance value of the series resistances 41a to 41d in the voltage selection circuit 8 to a value 100 or more times higher than a resistance value of the fixed resistance 5. In addition, the terminal voltage V14 of the voltage selection circuit 8 is taken out by a buffer amplifier 9, and is outputted as a terminal voltage V11 at one terminal 11 of the temperature measuring resistor 3. Here, the terminal voltage V14 has approximately the same potential as the terminal voltage V11. Arranging the buffer amplifier 9 reduces variations of the potential of the terminal voltage V14 due to resistance changes of the temperature measuring resistor 3.

The temperature measuring resistor 4 is connected to the other terminal of the temperature measuring resistor 3 to form a second series circuit. In addition, one terminal of the temperature measuring resistor 2 and one terminal of the temperature measuring resistor 4 are connected to each other to have the same potential (second reference potential). Note that, the second reference potential is set to be a ground potential.

In the embodiment, the first reference potential is set to be the reference voltage Vref and the second reference potential is set to be the ground potential. Alternatively, the first reference potential may be set to be a ground potential and the second reference potential may be set to be the reference voltage Vref.

In addition, a voltage comparator 12 compares a voltage between the temperature measuring resistor 3 and the temperature measuring resistor 4 to a voltage between the temperature measuring resistor 1 and the temperature measuring resistor 2, and a current of the heat-generating resistor 13 is controlled so that a difference between the voltages may become small. Thus, the temperature in the heat-generating resistor 13 is heat controlled to be higher by a predetermined temperature than the temperature in the temperature measuring resistors 1, 2, and 4 that detect the temperature in the fluid to be measured.

Here, the temperature measuring resistor 1 and the temperature measuring resistor 3 are made of the same material so as to have approximately the same resistance value and resistance temperature coefficient at the same temperature. Furthermore, the temperature measuring resistor 2 and the temperature measuring resistor 4 are made of the same material so as to have approximately the same resistance value and resistance temperature coefficient at the same temperature. More preferably, the temperature measuring resistors 1 to 4 are made of the same material so as to have approximately the same resistance value and resistance temperature coefficient at the same temperature. Thus, the resistances can be processed with the same material and under the same condition. This improves the accuracy of the resistance balance of the temperature measuring resistors 1 to 4, thereby improving the adjustment accuracy more effectively. These resistors are preferably made of resistance materials having a resistance temperature coefficient of 1000 ppm/° C. or more, including semiconductor materials, such as polycrystalline silicon (Poly-Si), or metal materials, such as platinum (Pt) and molybdenum (Mo), for example.

The fixed resistance 5 is made of the resistance material having a resistance temperature coefficient smaller than that of the temperature measuring resistor 1. The resistance temperature coefficient is preferably 100 ppm/° C. or less.

Next, a flow rate detection circuit in the thermal flow meter according to the embodiment will be described.

Figure 2:
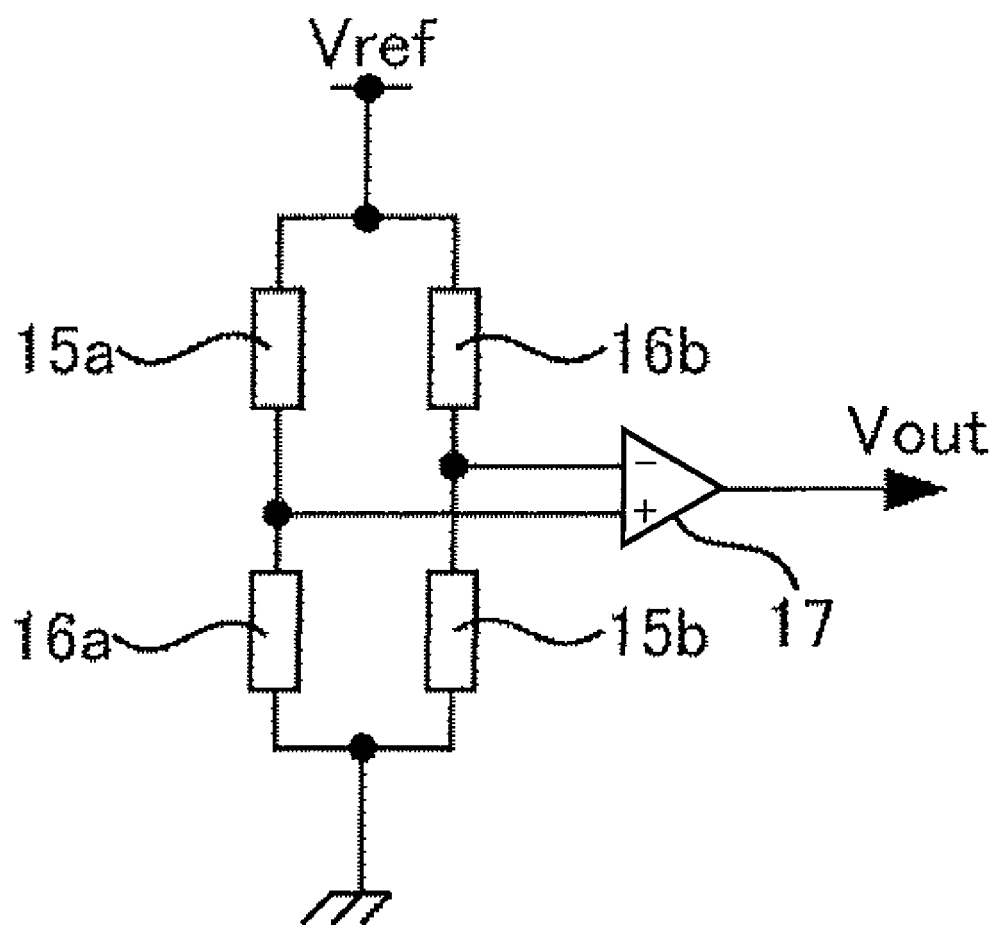
FIG. 2 shows a flow rate detection circuit in the thermal flow meter according to the first embodiment of the present invention.

FIG. 2 shows the flow rate detection circuit according to the embodiment. The flow rate detection circuit is composed of upstream temperature sensors 15a and 15b and downstream-side temperature sensors 16a and 16b that are placed near the heat-generating resistor 13. The upstream temperature sensors 15a and 15b are placed upstream of the heat-generating resistor 13 with respect to the flow direction of the fluid to be measured, and the downstream temperature sensors 16a and 16b are placed downstream of the heat-generating resistor 13 with respect to the flow direction of the fluid to be measured.

Furthermore, a bridge circuit is formed by connecting a series circuit including the upstream temperature sensor 15a and the downstream temperature sensor 16a in parallel to a series circuit including the downstream temperature sensor 16b and the upstream temperature sensor 15b, and the reference voltage Vref is applied to the bridge circuit. If a temperature difference occurs between the upstream temperature sensors (15a and 15b) and the downstream temperature sensors (16a and 16b) due to air flow, resistance balance of the bridge circuit will be changed to generate a differential voltage. The differential voltage is taken out by an amplifier 17, so that an output voltage Vout in accordance with the air flow rate can be obtained.

Next, the configuration of a sensor element 18 in the thermal flow meter according to the embodiment will be described.

Figure 3:
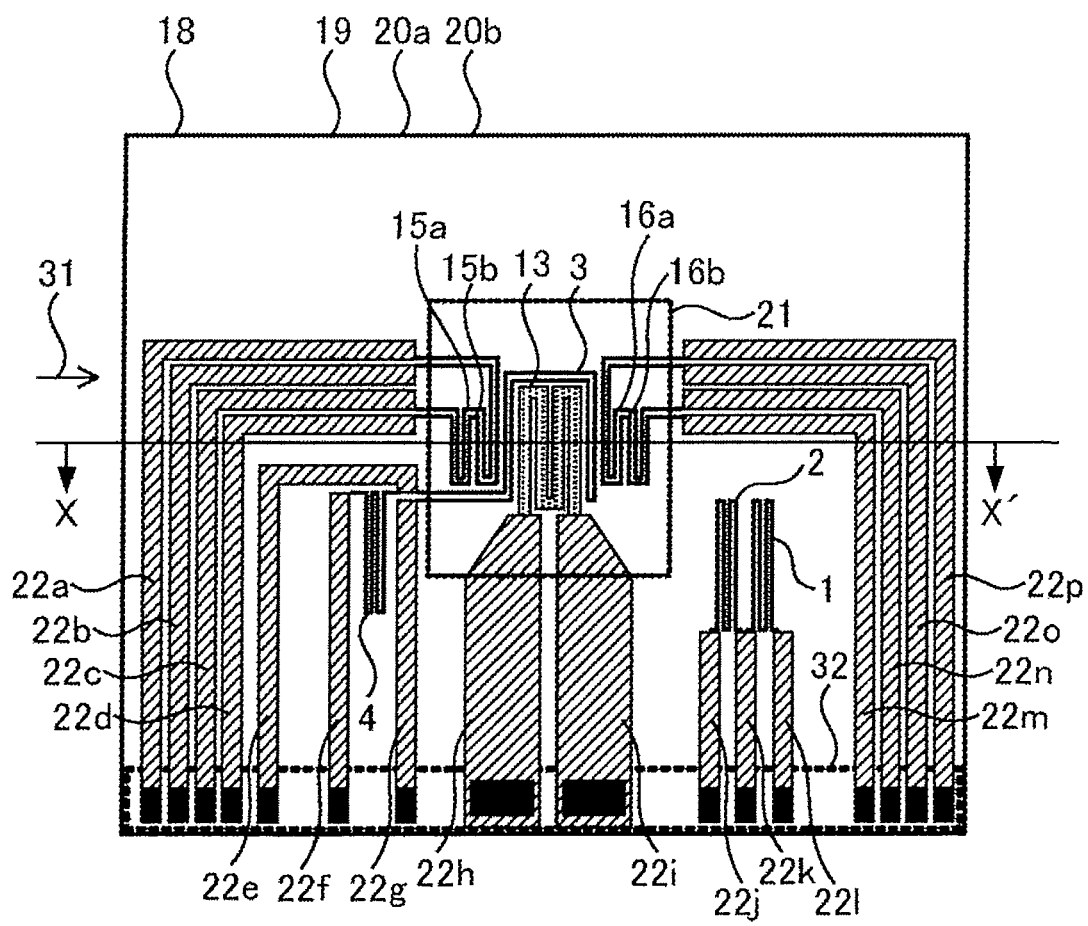
FIG. 3 is a plan view of a sensor element 18 in the thermal flow meter according to the first embodiment of the present invention.
Figure 4:
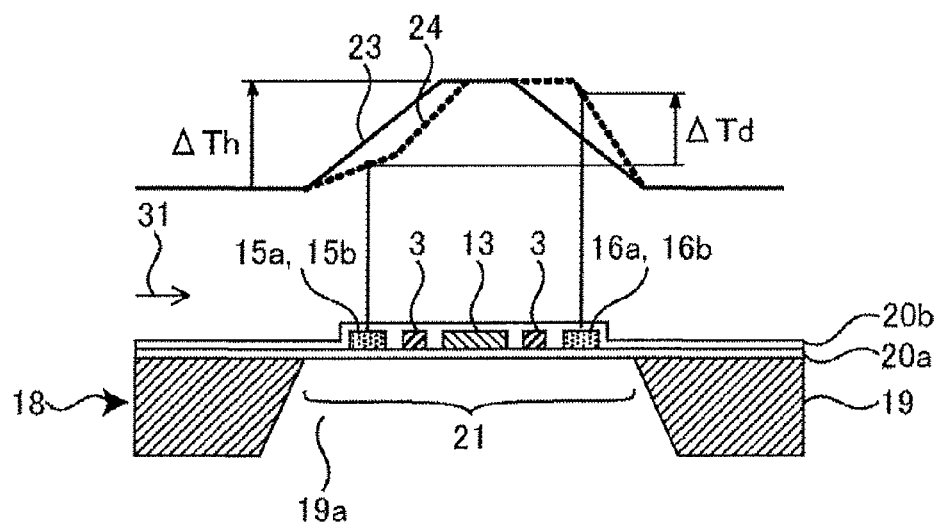
FIG. 4 is a cross-sectional view of the sensor element 18 taken along the line X-X" in FIG. 3.

The configuration of the sensor element 18 in the thermal flow meter according to the embodiment will be described with reference to FIGS. 3 and 4. FIG. 3 is a plan view showing the sensor element 18. FIG. 4 shows a cross-sectional view taken along the line X-X' in FIG. 3. A substrate 19 of the sensor element 18 is made of materials excellent in thermal conductivity, such as silicon or ceramic. Furthermore, an electrical insulating film 20a is formed on the substrate 19, and a hollow section 19a is formed by etching the substrate 19 from the rear surface thereof in such a manner that a diaphragm section 21 is formed.

The heat-generating resistor 13 is formed on a surface near the center of the electrical insulating film 20a on the diaphragm section 21. The temperature measuring resistor 3 that detects the heating temperature in the heat-generating resistor 13 is foamed to surround the heat-generating resistor 13. The temperature measuring resistor 3 detects the temperature in the heat-generating resistor 13, and the temperature in the heat-generating resistor 13 is heat controlled to be higher by a predetermined temperature than the temperature in an air flow 31 that is the fluid to be measured. In addition, the upstream temperature sensors 15a and 15b and the downstream temperature sensors 16a and 16b are placed at both sides of the heat-generating resistor 13 and the temperature measuring resistor 3. The upstream temperature sensors 15a and 15b are placed upstream of the center of the heat-generating resistor 13, and the downstream temperature sensors 16a and 16b are placed downstream of the center of the heat-generating resistor 13. An outermost surface of the sensor element 18 is covered with an electrical insulating film 20b. The electrical insulating film 20b serves as an electronic insulation or a protective film. The temperature measuring resistors 1, 2, and 4 whose resistance values change depending on the temperature in the air flow 31 are placed on the electrical insulating film 20a at the outer side of the diaphragm section 21.

The heat-generating resistor 13, the temperature measuring resistors 1, 2, 3, and 4, the upstream temperature sensors 15a and 15b, and the downstream temperature sensors 16a and 16b are formed of materials each having a higher relative resistance temperature coefficient and a resistance value changing in accordance with temperatures. Examples of such materials are semiconductor materials such as polycrystalline silicon and single crystal silicon doped with impurities, or metal materials such as platinum, molybdenum, tungsten, and a nickel alloy. Furthermore, the electrical insulating films 20a and 20b are formed in a thin film shape having the thickness of about two micrometers of silicon dioxide ($SiO_2$) or silicon nitride ($Si_3N_4$) to realize the structure that can obtain sufficient thermal insulation effects.

An electrode pad section 32 is further provided on the end portion of the sensor element 18. The electrode pad section 32 is made of aluminum or the like, and takes out electrodes of the above-mentioned resistors to connect the electrodes to the drive and detection circuits. The heat-generating resistor 13, the temperature measuring resistors 1 to 4, the upstream temperature sensors 15a and 15b, and the downstream temperature sensors 16a and 16b are connected to the electrode pad section 32 through wirings 22a to 22p. The wirings 22a to 22p are preferably made of materials having the smallest resistance value possible, such as aluminum. Alternatively, the wirings 22a to 22p can be made of the same material that makes the heat-generating resistor 13, the temperature measuring resistors 1 to 4, the upstream temperature sensors 15a and 15b, and the downstream temperature sensors 16a and 16b. In this case, using the same material simplifies the production process.

The thermal flow meter according to the embodiment of the present invention operates as follows.

FIG. 4 shows the distributions 23 and 24 of the surface temperature in the sensor element 18, together with the cross-sectional configuration of the sensor element 18. The temperature distribution 23 shows the temperature distribution of the diaphragm section 21 in a calm state. The heat-generating resistor 13 heats the air to the temperature higher by ΔTh than the temperature in the air flow 31. The temperature distribution 24 shows the temperature distribution of the diaphragm section 21 when the air flow 31 occurs. The air flow 31 cools the upstream side of the heat-generating resistor 13, so that the temperature at the upstream side thereof decreases, while the air heated after flowing through the heat-generating resistor 13 flows through the downstream side of the heat-generating resistor 13, so that the temperature at the downstream side thereof increases. Accordingly, the upstream temperature sensors 15a and 15b and the downstream temperature sensors 16a and 16b detect a temperature difference ΔTd between the upstream and downstream flows of the heat-generating resistor 13, thereby a flow rate is measured.

Figure 5:
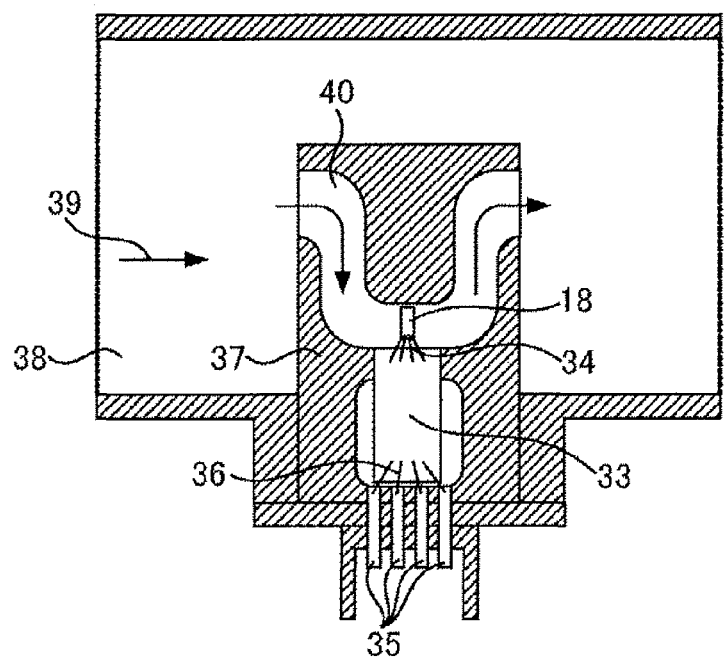
FIG. 5 is a view showing a mounting structure of the sensor element 18 in FIG. 3.

Next, FIG. 5 shows an example in which the above-mentioned sensor element 18 and drive and detection circuits are mounted in an intake pipeline of an internal combustion engine in an automobile and the like. In FIG. 5, a base member 37 is provided to extend from a wall surface of an intake pipeline 38. A secondary path 40 that takes in a part of intake air 39 flowing through the intake pipeline 38 is provided in the base member 37. The sensor element 18 is placed in a rectangular recess portion provided in the secondary path 40. Furthermore, in the base member 37, a circuit substrate 33 on which the drive circuit of the sensor element 18 is mounted is provided and a gold bonding wire 34 electrically connects the sensor element 18 to the drive circuit on the circuit substrate 33. In addition, terminals 35 are provided in order to supply a power supply and take out an output signal to and from the drive circuit, and aluminum bonding wires 36 electrically connect the terminals 35 to the drive circuit on the circuit substrate 33.

Next, the detailed configuration of the voltage generation circuit 10 according to the embodiment will be described with reference to FIG. 6.

The voltage selection circuit 8 inside the voltage generation circuit 10 will be described. A series resistance circuit including the resistances 41a to 41d is provided therein, and the series resistance circuit is connected in parallel to the fixed resistance 5. Furthermore, each electrode between adjacent resistances in the series resistance circuit is taken out, and is connected to one of a source terminal and a drain terminal of each of MOS transistors 42a to 42e. For example, an electrode between the resistance 41a and the resistance 41b is connected to a source terminal or a drain terminal of the MOS transistor 42b. The other of the source terminal or the drain terminal of each of the MOS transistors 42a to 42e is connected to a single connection point (terminal voltage V14).

The MOS transistors 42a to 42e operate as semiconductor switches by electrically opening and closing (ON and OFF) between the source and the drain in accordance with setting of a gate voltage. Accordingly, selecting the MOS transistor to be turned ON among the MOS transistors 42a to 42e makes it possible to select a voltage between the arbitrary resistances in the series resistance circuit including the resistances 41a to 41d, and to output the selected voltage to the terminal voltage V14.

Next, the buffer amplifier 9 includes a differential amplifier circuit 43 and an output circuit 44. A non-inverting input terminal of the differential amplifier circuit 43 is connected to the terminal voltage V14. Furthermore, an inverting input terminal of the differential amplifier circuit 43 is inputted to an output terminal (terminal voltage V11) of the output circuit 44 to form a unity gain buffer. The circuit configuration of the output circuit 44 is a source grounded drain output circuit, and is capable of expanding a dynamic range of the output voltage. This is because a voltage value of the terminal voltage V14 is a value close to the reference voltage Vref and a sufficient output voltage range can be ensured when the reference voltage Vref and a power supply voltage Vcc are set to be the same potential.

In the voltage selection circuit 8, the resistances 41a to 41d are made using the semiconductor process, and are made by using polysilicon, a diffusive resistance, or the like. Thus, the voltage generation circuit 10 can be a combined integrated circuit, thereby downsizing can be achieved. A memory is provided in the integrated circuit to achieve the configuration of writing a selection position by the voltage selection circuit 8. This makes it possible to electrically select and change the voltage value of the terminal voltage V11, thereby simplifying the adjustment process and to reduce the adjustment time. Accordingly, a low cost can be achieved.

The above-mentioned configuration makes it possible to adjust that resistance balance of the resistors that control the heating temperature in the heat-generating resistor 13 with high accuracy, without using mechanical trimming. Alternatively, by using the conventional trimming as well, the circuit configuration in the embodiment can adjust the resistance balance with high accuracy that cannot be adjusted by the conventional trimming only.

Second Embodiment

A second embodiment according to the present invention will be described below.

A drive circuit in a thermal flow meter according to the embodiment will be described. In the embodiment, the portions different from the first embodiment will be described.

Figure 7:
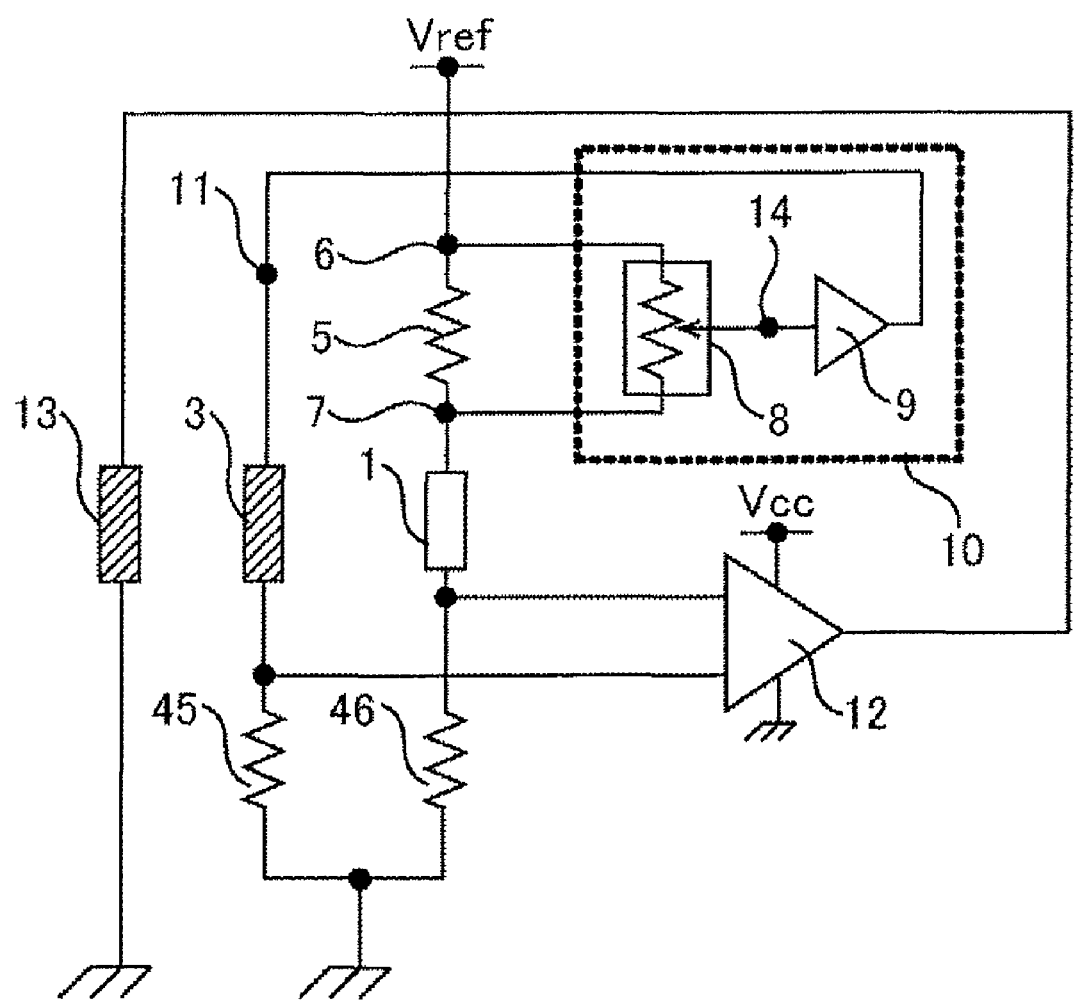
FIG. 7 shows a drive circuit in a thermal flow meter according to a second embodiment of the present invention.

FIG. 7 shows a drive circuit of a heat-generating resistor 13. The drive circuit includes: a temperature measuring resistor 3 (third resistor) that is placed near the heat-generating resistor 13 and whose resistance value varies with the temperature in the heat-generating resistor 13; fixed resistances 5, 45 (fourth resistor), and 46 (second resistor) whose resistance values hardly depend on the temperature; and a temperature measuring resistor 1 (first resistor) whose resistance value varies with the temperature in a fluid to be measured. The resistance balance of these resistors controls the heating temperature in the heat-generating resistor 13.

A reference voltage Vref that is a first reference potential is applied to a series circuit including the fixed resistance 5, the temperature measuring resistor 1, and the fixed resistance 46. A terminal voltage V6 and a terminal voltage V7 at both ends 6 and 7 of the fixed resistance 5 are taken out, and are inputted to a voltage generation circuit 10. In the voltage generation circuit 10, as shown in FIG. 6, multiple resistances 41a to 41d are connected to one another in series, and a voltage selection circuit 8 that takes out a terminal voltage between arbitrary resistances selects an arbitrary voltage within the voltage range from the terminal voltage V6 to the terminal voltage V7 so that the voltage selection circuit 8 obtains a terminal voltage V14 at an output 14 thereof. A current flowing into the voltage selection circuit 8 is made to be the minimum by setting a resistance value of the series resistances 41a to 41d in the voltage selection circuit 8 to a value 100 or more times higher than the resistance value of the fixed resistance 5. In addition, the terminal voltage V14 in the voltage selection circuit 8 is taken out by a buffer amplifier 9, and is outputted as a terminal voltage V11 at one terminal of the temperature measuring resistor 3. Here, the terminal voltage V14 has approximately the same potential as the terminal voltage V11. The buffer amplifier 9 reduces variations of the potential of the terminal voltage V14 due to resistance changes of the temperature measuring resistor 3.

The fixed resistance 45 is connected to the other terminal of the temperature measuring resistor 3 to form a second series circuit. In addition, one terminal of the fixed resistance 46 and one terminal of the fixed resistance 45 are connected to each other to have the same potential (second reference potential). Note that, the second reference potential is set to be a ground potential.

In the embodiment, the first reference potential is set to be the reference voltage Vref and the second reference potential is set to be the ground potential. Alternatively, the first reference potential also may be set to be a ground potential and the second reference potential may be set to be the reference voltage Vref.

In addition, a voltage comparator 12 compares a voltage between the temperature measuring resistor 3 and the fixed resistance 45 to a voltage between the temperature measuring resistor 1 and the fixed resistance 46, and a current of the heat-generating resistor 13 is controlled so that a difference between the voltages may become small. Thus, the temperature in the heat-generating resistor 13 is heat controlled to be higher by a predetermined temperature than the temperature in the temperature measuring resistor 1 that detects the temperature in the fluid to be measured.

Here, the temperature measuring resistor 1 and the temperature measuring resistor 3 are made of the same material so as to have approximately the same resistance value and resistance temperature coefficient at the same temperature. Furthermore, the fixed resistance 45 and the fixed resistance 46 are selected to have approximately the same resistance value, and preferably are made of the same material as the fixed resistance 5. Thus, the resistances can be processed with the same material and under the same condition. This improves the accuracies of the resistance balance of the temperature measuring resistor 1 and the temperature measuring resistor 3 as well as the resistance balance of the fixed resistance 45 and the fixed resistance 46, thereby improving the adjustment accuracy more effectively.

The fixed resistances 5, 45, and 46 are made of the resistance material having a resistance temperature coefficient lower than that of the temperature measuring resistor 1. The resistance temperature coefficient is preferably 100 ppm/° C. or less.

The above-mentioned configuration also makes it possible to adjust that resistance balance of the resistors that control the heating temperature in the heat-generating resistor 13 with high accuracy, without using mechanical trimming. Alternatively, by using the conventional trimming as well, the circuit configuration in the embodiment can adjust the resistance balance with high accuracy that cannot be adjusted by the conventional trimming.

Third Embodiment

A third embodiment according to the present invention will be described below.

A drive circuit in a thermal flow meter according to the embodiment will be described. In the embodiment, the portions different from the first embodiment will be described.

Figure 8:
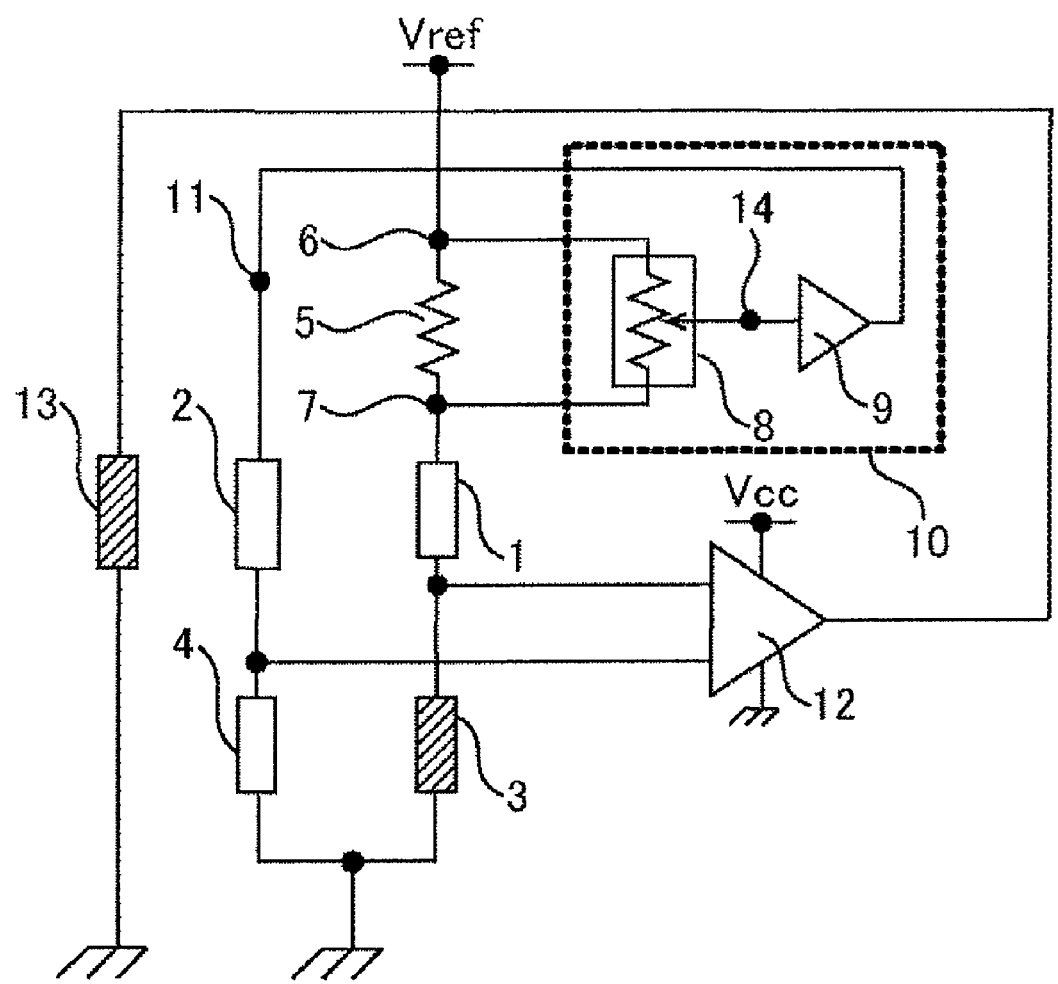
FIG. 8 shows a drive circuit in a thermal flow meter according to a third embodiment of the present invention.

FIG. 8 shows a drive circuit of a heat-generating resistor 13. The drive circuit includes: a temperature measuring resistor 3 (second resistor) that is placed near the heat-generating resistor 13 and whose resistance value varies with the temperature in the heat-generating resistor 13; temperature measuring resistors 1 (first resistor), 2 (third resistor), and 4 (fourth resistor) whose resistance values vary with the temperature in a fluid to be measured; and the fixed resistance 5 whose resistance value hardly depends on the temperature. The resistance balance of these resistors controls the heating temperature in the heat-generating resistor 13.

A reference voltage Vref that is a first reference potential is applied to a series circuit including the fixed resistance 5, the temperature measuring resistor 1, and the temperature measuring resistor 3. A terminal voltage V6 and a terminal voltage V7 at both ends 6 and 7 of the fixed resistance 5 are taken out, and are inputted to a voltage generation circuit 10. In the voltage generation circuit 10, as shown in FIG. 6, multiple resistances 41a to 41d are connected to one another in series, and a voltage selection circuit 8 that takes out a terminal voltage between arbitrary resistances selects an arbitrary voltage within the voltage range from the terminal voltage V6 to the terminal voltage V7 so that the voltage selection circuit 8 obtains a terminal voltage V14 at an output 14 thereof. A current flowing into the voltage selection circuit 8 is made to be the minimum by setting a resistance value of the series resistances 41a to 41d in the voltage selection circuit 8 to a value 100 or more times higher than the resistance value of the fixed resistance 5. In addition, the terminal voltage V14 in the voltage selection circuit 8 is taken out by a buffer amplifier 9, and is outputted as a terminal voltage V11 at one terminal of the temperature measuring resistor 2. Here, the terminal voltage V14 has approximately the same potential as the terminal voltage V11. The buffer amplifier 9 reduces variations of the potential of the terminal voltage V14 due to resistance changes of the temperature measuring resistor 2.

The temperature measuring resistor 4 is connected to the other terminal of the temperature measuring resistor 2 to form a second series circuit. In addition, one terminal of the temperature measuring resistor 4 and one terminal of the temperature measuring resistor 3 are connected to each other to have the same potential (second reference potential). Note that, the second reference potential is set to be a ground potential.

In the embodiment, the first reference potential is set to be the reference voltage Vref and the second reference potential is set to be the ground potential. Alternatively, the first reference potential also may be set to be a ground potential and the second reference potential may be set to be the reference voltage Vref.

In addition, a voltage comparator 12 compares a voltage between the temperature measuring resistor 2 and the temperature measuring resistor 4 to a voltage between the temperature measuring resistor 1 and the temperature measuring resistor 3, and a current of the heat-generating resistor 13 is controlled so that a difference between the voltages may become small. Thus, the temperature in the heat-generating resistor 13 is heat controlled to be higher by a predetermined temperature than the temperature in the temperature measuring resistors 1, 2, and 4 that detect the temperature in the fluid to be measured.

Here, the temperature measuring resistors 1 to 4 are made of the same material so as to have approximately the same resistance value and resistance temperature coefficient at the same temperature. Thus, the resistances can be processed with the same material and under the same condition. This improves the accuracies of the temperature measuring resistors 1 to 4, thereby improving the adjustment accuracy more effectively.

The fixed resistance 5 is made of the resistance material having a resistance temperature coefficient lower than that of the temperature measuring resistors 1 to 4. The resistance temperature coefficient is preferably 100 ppm/° C. or less.

The above-mentioned configuration also makes it possible to adjust that resistance balance of the resistors that control the heating temperature in the heat-generating resistor 13 with high accuracy, without using mechanical trimming. Alternatively, by using the conventional trimming as well, the circuit configuration in the embodiment can adjust the resistance balance with high accuracy that cannot be adjusted by the conventional trimming.

Fourth Embodiment

A fourth embodiment according to the present invention will be described below.

A drive circuit in a thermal flow meter according to the embodiment will be described. In the embodiment, the portions different from the second embodiment will be described.

Figure 9:
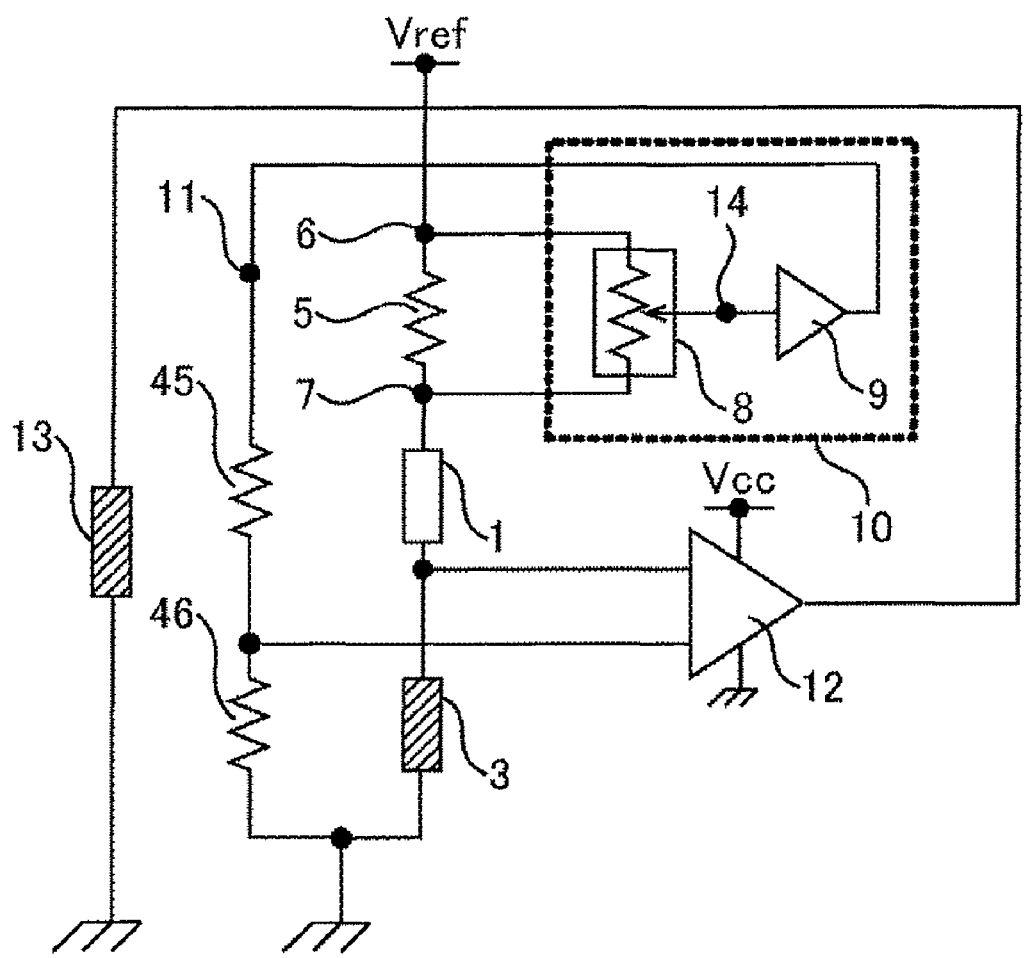
FIG. 9 shows a drive circuit in a thermal flow meter according to a fourth embodiment of the present invention.

FIG. 9 shows a drive circuit of a heat-generating resistor 13 according to the embodiment. The drive circuit includes: a temperature measuring resistor 3 (second resistor) that is placed near the heat-generating resistor 13 and whose resistance value varies with the temperature in the heat-generating resistor 13; fixed resistances 5, 45 (third resistor), and 46 (fourth resistor) whose resistance values hardly depend on the temperature; and a temperature measuring resistor 1 (first resistor) whose resistance value varies with the temperature in a fluid to be measured. The resistance balance of these resistors controls the heating temperature in the heat-generating resistor 13.

A reference voltage Vref that is a first reference potential is applied to a series circuit including the fixed resistance 5, the temperature measuring resistor 1, and the temperature measuring resistor 3. A terminal voltage V6 and a terminal voltage V7 at both ends 6 and 7 of the fixed resistance 5 are taken out, and are inputted to a voltage generation circuit 10. In the voltage generation circuit 10, as shown in FIG. 6, multiple resistances 41a to 41d are connected to one another in series, and a voltage selection circuit 8 that takes out a terminal voltage between arbitrary resistances selects an arbitrary voltage within the voltage range from the terminal voltage V6 to the terminal voltage V7 so that the voltage selection circuit 8 obtains a terminal voltage V14 at an output 14 thereof. A current flowing into the voltage selection circuit 8 is made to be the minimum by setting a resistance value of the series resistances 41a to 41d in the voltage selection circuit 8 to a value 100 or more times higher than the resistance value of the fixed resistance 5. In addition, the terminal voltage V14 in the voltage selection circuit 8 is taken out by a buffer amplifier 9, and is outputted as a terminal voltage V11 at one terminal of the fixed resistance 45. Here, the terminal voltage V14 has approximately the same potential as the terminal voltage V11.

The fixed resistance 46 is connected to the other terminal of the fixed resistance 45 to form a second series circuit. In addition, one terminal of the fixed resistance 46 and one terminal of the temperature measuring resistor 3 are connected to each other to have the same potential (second reference potential). Note that, the second reference potential is set to be a ground potential.

In the embodiment, the first reference potential is set to be the reference voltage Vref and the second reference potential is set to be the ground potential. Alternatively, the first reference potential also may be set to be a ground potential and the second reference potential may be set to be the reference voltage Vref.

In addition, a voltage comparator 12 compares a voltage between the fixed resistance 45 and the fixed resistance 46 to a voltage between the temperature measuring resistor 1 and the temperature measuring resistor 3, and a current of the heat-generating resistor 13 is controlled so that a difference between the voltages may become small. Thus, the temperature in the heat-generating resistor 13 is heat controlled to be higher by a predetermined temperature than the temperature in the temperature measuring resistor 1 that detects the temperature in the fluid to be measured.

Here, the temperature measuring resistor 1 and the temperature measuring resistor 3 are made of the same material so as to have approximately the same resistance value and resistance temperature coefficient at the same temperature. Furthermore, the fixed resistance 45 and the fixed resistance 46 are selected to have approximately the same resistance value, and preferably are made of the same material as the fixed resistance 5. Thus, the resistances can be processed with the same material and under the same condition. This improves the accuracies of the resistance balance of the temperature measuring resistor 1 and the temperature measuring resistor 3 and the resistance balance of the fixed resistance 45 and the fixed resistance 46, thereby improving the adjustment accuracy more effectively.

The fixed resistances 5, 45, and 46 are made of the resistance material having a resistance temperature coefficient lower than that of the temperature measuring resistor 1. The resistance temperature coefficient is preferably 100 ppm/° C. or less.

The above-mentioned configuration also makes it possible to adjust that resistance balance of the resistors that control the heating temperature in the heat-generating resistor 13 with high accuracy, without using a mechanical variable resistance. Alternatively, by using the conventional trimming as well, the circuit configuration in the embodiment can adjust the resistance balance with high accuracy that cannot be adjusted by the conventional trimming.

Fifth Embodiment

A fifth embodiment according to the present invention will be described below.

Figure 10:
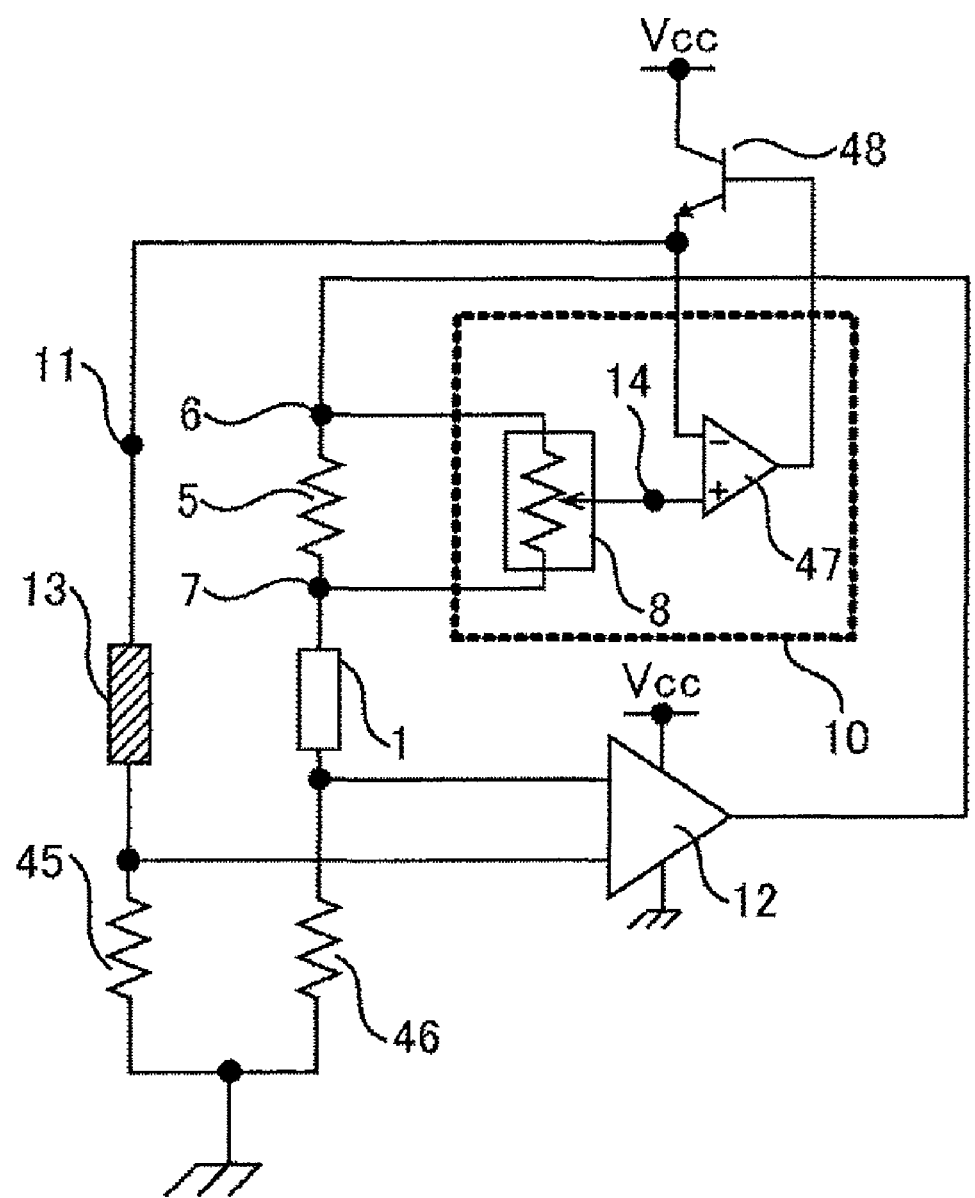
FIG. 10 shows a drive circuit in a thermal flow meter according to a fifth embodiment of the present invention.

FIG. 10 shows a drive circuit of a heat-generating resistor 13 according to the embodiment. The heating temperature in the heat-generating resistor 13 is controlled by the resistance balance of: the heat-generating resistor 13 (third resistor); a temperature measuring resistor 1 (first resistor) whose resistance value varies with the temperature in a fluid to be measured; and fixed resistances 5, 45 (fourth resistor), and 46 (second resistor) whose resistance values hardly depend on the temperature.

A first series circuit includes the fixed resistance 5, the temperature measuring resistor 1, and the fixed resistance 46. A terminal voltage V6 and a terminal voltage V7 at both ends 6 and 7 of the fixed resistance 5 are taken out, and are inputted to a voltage generation circuit 10. In the voltage generation circuit 10, as shown in FIG. 6, multiple resistances 41a to 41d are connected to one another in series, and a voltage selection circuit 8 that takes out a terminal voltage between arbitrary resistances selects an arbitrary voltage within the voltage range from the terminal voltage V6 to the terminal voltage V7, so that the voltage selection circuit 8 obtains a terminal voltage V14 at an output 14 thereof. A current flowing into the voltage selection circuit 8 is made to be the minimum by setting a resistance value of the series resistances 41a to 41d in the voltage selection circuit 8 to a value 100 or more times higher than the resistance value of the fixed resistance 5. In addition, the terminal voltage V14 of the voltage selection circuit 8 is inputted to a non-inverting input terminal of a differential amplifier 47. An output from the differential amplifier 47 is connected to a base of a transistor 48. A collector of the transistor 48 is connected to a power supply voltage Vcc, and an emitter thereof is connected as a terminal voltage V11 at one terminal of the heat-generating resistor 13. An inverting input terminal of the differential amplifier 47 is connected to the emitter of the transistor 48. The differential amplifier 47 operates in such a manner that the terminal voltage V14 and the terminal voltage V11 have the same potential. Here, the transistor 48 is provided as a means for obtaining a current that heats the heat-generating resistor 13 to a high temperature.

The fixed resistance 45 is connected to the other terminal of the heat-generating resistor 13 to form a second series circuit. In addition, one terminal of the fixed resistance 45 and one terminal of the fixed resistance 46 are connected to each other to have the same potential (the second reference potential). Note that, the second reference potential is set to be a ground potential.

In addition, a voltage comparator 12 compares a voltage between the heat-generating resistor 13 and the fixed resistance 45 to a voltage between the temperature measuring resistor 1 and the fixed resistance 46, and a voltage in accordance with the difference is supplied to one terminal of the fixed resistance 5. In other words, an output from the voltage comparator 12 becomes a first reference potential that is supplied to the series circuit including the fixed resistance 5, the temperature measuring resistor 1, and the fixed resistance 46. In this case, the first reference potential is not a fixed potential, but a potential to be changed. For example, a voltage of the terminal voltage V14 increases as the output from the voltage comparator 12 increases. Furthermore, a voltage value of the terminal voltage V11 increases with the operation by the differential amplifier 47 to increase a current flowing through the heat-generating resistor 13, thereby controlling the temperature in the heat-generating resistor 13. Thus, the temperature in the heat-generating resistor 13 is heat controlled to be higher by a predetermined temperature than the temperature in the temperature measuring resistor 1 that detects the temperature in the fluid to be measured.

Here, the heat-generating resistor 13 and the temperature measuring resistor 1 are made of the same material so as to have approximately the same resistance temperature coefficient at the same temperature. Furthermore, the fixed resistance 5, the fixed resistance 45, and the fixed resistance 46 are preferably made of the same material. Thus, the resistances can be processed with the same material and under the same condition. This improves the accuracies of the resistance balance of the heat-generating resistor 13 and the temperature measuring resistor 1 as well as the resistance balance of the fixed resistance 45 and the fixed resistance 46, thereby improving the adjustment accuracy more effectively.

The fixed resistances 5, 45, and 46 are made of the resistance material having a resistance temperature coefficient lower than that of the temperature measuring resistor 1. The resistance temperature coefficient is preferably 100 ppm/° C. or less.

The above-mentioned configuration also makes it possible to adjust that resistance balance of the resistors that control the heating temperature in the heat-generating resistor 13 with high accuracy, without using a mechanical variable resistance. Alternatively, by using the conventional trimming as well, the circuit configuration in the embodiment can adjust the resistance balance with high accuracy that cannot be adjusted by the conventional trimming.

In the above-mentioned first to fifth embodiments, two pairs of the temperature measuring resistors 15a, 15b, and 16a, 16b that are placed at the upstream and downstream sides of the heat-generating resistor 13 respectively have been described; however, the configuration with only a pair of temperature measuring resistors also exhibits the same effect.

Furthermore, in the embodiment, description has been made for the method for measuring a flow rate and a flow direction based on the temperature differences among the temperature sensor temperature measuring resistors 15a, 15b, and 16a, 16b that are respectively placed at the upstream and downstream sides of the heat-generating resistor 13; however, a method for measuring a flow rate and a flow direction based on a heating current or a resistance change of the heat-generating resistor 13 also exhibits the same effect.

Sixth Embodiment

A sixth embodiment according to the present invention will be described below.

Figure 11:
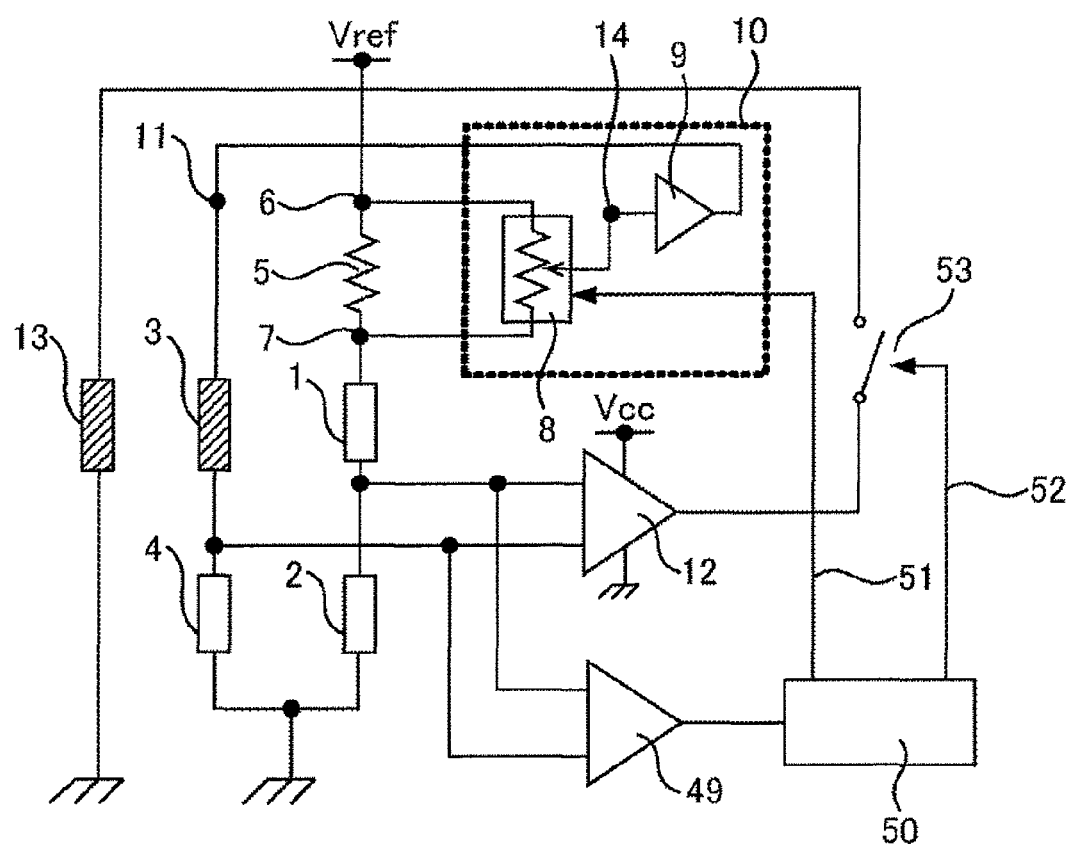
FIG. 11 shows a drive circuit in a thermal flow meter according to a sixth embodiment of the present invention.

FIG. 11 shows a drive circuit of a heat-generating resistor 13 according to the embodiment. In the embodiment, the portions different from the first embodiment will be described.

The drive circuit according to the embodiment includes a differential amplifier 49 that takes out a differential voltage of a voltage between a temperature measuring resistor 3 and a temperature measuring resistor 4 and a voltage between a temperature measuring resistor 1 and a temperature measuring resistor 2. In addition, an output signal from the differential amplifier 49 is inputted to an adjustment means 50. Furthermore, a voltage control circuit 53 is provided between the heat-generating resistor 13 and a voltage comparator 12. The adjustment means 50 outputs to the voltage control circuit 53 a current control signal 52 that controls a current flowing through the heat-generating resistor 13. Furthermore, the adjustment means 50 outputs to a voltage selection circuit 8 an electrical selection signal 51 that determines a voltage selection position.

The adjustment means 50 electrically transmits a signal to the voltage control circuit 53 to control the current flowing through the heat-generating resistor 13. Preferably, the adjustment means 50 breaks the current to stop the heat-generating resistor 13 from heating up. Furthermore, based on the output signal from the differential amplifier 49, the adjustment means 50 calculates a voltage selection position suitable in the voltage selection circuit 8, and outputs the voltage selection signal 51. The voltage selection circuit 8 selects a voltage selection position based on the voltage selection signal 51 from the adjustment means 50 to output a terminal voltage V14. Furthermore, the adjustment means 50 cancels the voltage control signal 52 and restores the heating control for the heat-generating resistor 13.

With the above-mentioned configuration, the thermal flow meter can self-adjust the voltage selection circuit 8. In addition, the regular automatic adjustment makes it possible to maintain an optimum value of the heating temperature in the heat-generating resistor 13 for long periods.

EXPLANATION OF REFERENCE NUMERALS 1, 2, 3, 4 . . . temperature measuring resistor, 5 . . . fixed resistance, 8 . . . voltage selection circuit, 9 . . . buffer amplifier, 10 . . . voltage generation circuit, 12 . . . voltage comparator, 13 . . . heat-generating resistor, 15a, 15b . . . upstream temperature sensor, 16a, 16b . . . downstream-side temperature sensor, 17 . . . amplifier, 18 . . . sensor element, 19 . . . substrate, 20a, 20b . . . electrical insulating film, 21 . . . diaphragm section, 22a to 22p . . . wiring, 23, 24 . . . temperature distribution, 31 . . . air flow, 32 . . . electrode pad section, 33 . . . circuit substrate, 34 . . . gold bonding wire, 35 . . . terminal, 36 . . . aluminum bonding wire, 37 . . . base member, 38 . . . intake pipeline, 39 . . . intake air, 40 . . . secondary path, 41a to 41 . . . resistance, 42a to 42e . . . MOS transistor, 43 . . . differential amplifier circuit, 44 . . . output circuit, 45, 46 . . . fixed resistance, 47 . . . differential amplifier, 48 . . . transistor, 49 . . . differential amplifier, 50 . . . adjustment means, 51 . . . selection signal, 52 . . . voltage control signal, 53 . . . voltage control circuit

What is claimed is:

1. A thermal flow meter comprising a control circuit to control a heating temperature in a heat-generating resistor that generates heat when a current flows therethrough, and measuring a flow rate of a fluid, wherein the control circuit includes: a first series circuit in which a fixed resistance, a first resistor, and a second resistor are connected to one another in series; a second series circuit in which a third resistor and a fourth resistor are connected to each other in series; and a voltage generation circuit that takes out voltages at both terminals of the fixed resistance and outputs a voltage adjusted within a range between the voltages at both terminals, a terminal at a side of the fixed resistance of the first series circuit is connected to a first reference potential, a terminal at a side of the third resistor of the second series circuit is connected to an output voltage of the voltage generation circuit, and the other terminal of the first series circuit and the other terminal of the second series circuit are connected to a second reference potential, and at least the first resistor and one among the second resistor and the third resistor are formed respectively of temperature-sensitive resistors each having a resistance temperature coefficient higher than that of the fixed resistance.

2. The thermal flow meter according to claim 1, wherein the heat-generating resistor is provided outside the control circuit, and the resistor formed of the temperature-sensitive resistor among the second resistor and the third resistor is placed near the heat-generating resistor.

3. The thermal flow meter according to claim 2, further comprising a planar substrate having a thin wall portion, wherein the heat-generating resistor and the resistor formed of the temperature-sensitive resistor among the second resistor and the third resistor are placed in the thin wall portion, and the resistor formed of the temperature-sensitive resistor among the second resistor and the third resistor is made of the same material as that of the first resistor.

4. The thermal flow meter according to claim 3, wherein one of the first and second reference potentials is set to be a ground potential and the other one of the first and second reference potentials is set to be higher than the one of the first and second reference potentials.

5. The thermal flow meter according to claim 2, wherein one of the first and second reference potentials is set to be a ground potential and the other one of the first and second reference potentials is set to be higher than the one of the first and second reference potentials.

6. The thermal flow meter according to claim 1, wherein all of the first resistor, the second resistor, the third resistor, and the fourth resistor are formed of temperature-sensitive resistors made of the same material.

7. The thermal flow meter according to claim 6, wherein one of the first and second reference potentials is set to be a ground potential and the other one of the first and second reference potentials is set to be higher than the one of the first and second reference potentials.

8. The thermal flow meter according to claim 1, wherein the third resistor is formed of the heat-generating resistor.

9. The thermal flow meter according to claim 8, wherein all the first resistor, the second resistor, the third resistor, and the fourth resistor are formed of temperature-sensitive resistors made of the same material.

10. The thermal flow meter according to claim 9, wherein one of the first and second reference potentials is set to be a ground potential and the other one of the first and second reference potentials is set to be higher than the one of the first and second reference potentials.

11. The thermal flow meter according to claim 8, wherein one of the first and second reference potentials is set to be a ground potential and the other one of the first and second reference potentials is set to be higher than the one of the first and second reference potentials.

12. The thermal flow meter according to claim 1, wherein one of the first and second reference potentials is set to be a ground potential and the other one of the first and second reference potentials is set to be higher than the one of the first and second reference potentials.

13. The thermal flow meter according to claim 1, wherein the voltage generation circuit includes:

a series resistance circuit including a plurality of resistances connected in parallel to both ends of the fixed resistance;

a voltage selection circuit that selects a connection point between any resistances in the series resistance circuit and outputs a voltage at the connection point; and a buffer amplifier that adds the voltage selected by the voltage selection circuit to the second series circuit.

14. The thermal flow meter according to claim 13, wherein the voltage selection circuit is formed of a transistor switch.

15. The thermal flow meter according to claim 1, wherein the resistance temperature coefficient of the fixed resistance is 100 ppm/° C. or less.

16. The thermal flow meter according to claim 1, further comprising:

a means for controlling a current flowing through the heat-generating resistor;

a means for detecting a differential voltage between a voltage in the first series circuit and a voltage in the second series circuit; and an adjustment means for selecting a voltage to be added to the second series circuit based on the differential voltage.

* * * * *